United States Patent
Ozeki et al.

(10) Patent No.: US 10,807,561 B2
(45) Date of Patent: Oct. 20, 2020

(54) AIRBAG

(71) Applicant: TOYODA GOSEI CO., LTD., Kiyosu-shi, Aichi-ken (JP)

(72) Inventors: Makoto Ozeki, Kiyosu (JP); Takashi Sasaki, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 72 days.

(21) Appl. No.: 16/358,785

(22) Filed: Mar. 20, 2019

(65) Prior Publication Data

US 2019/0299918 A1 Oct. 3, 2019

(30) Foreign Application Priority Data

Mar. 29, 2018 (JP) .................. 2018-064848

(51) Int. Cl.
*B60R 21/2338* (2011.01)
*B60R 21/36* (2011.01)

(52) U.S. Cl.
CPC .......... *B60R 21/36* (2013.01); *B60R 21/2338* (2013.01); *B60R 2021/23382* (2013.01)

(58) Field of Classification Search
CPC ................ B60R 21/36; B60R 21/2338; B60R 2021/23382
USPC ..................................................... 280/743.2
See application file for complete search history.

(56) References Cited

U.S. PATENT DOCUMENTS

| 9,126,566 B2* | 9/2015 | Jeong .................. B60R 21/2346 |
| 2014/0015234 A1 | 1/2014 | Nukaya et al. |
| 2019/0039560 A1* | 2/2019 | Ozeki ..................... B60R 21/36 |
| 2019/0077358 A1* | 3/2019 | Fujimaki ............... B60R 21/203 |
| 2019/0299920 A1* | 10/2019 | Ozeki ..................... B60R 21/36 |

FOREIGN PATENT DOCUMENTS

| JP | 2014-019193 A | | 2/2014 |
| JP | 2016097833 A | * | 5/2016 |
| JP | 2016117387 A | * | 6/2016 |

* cited by examiner

*Primary Examiner* — Ruth Ilan
(74) *Attorney, Agent, or Firm* — Posz Law Group, PLC

(57) ABSTRACT

An airbag includes panels, which face each other, of an outer peripheral wall upon inflation configured to change a thickness of the airbag from a thickened part to a thinned part by a tether coupled to the panels. The tether is divided into a plurality of pieces along a direction in which the panels face each other, and is thus configured by a plurality of divided pieces to be sewn each other at a linear sewing line. A panel-side divided piece sewn to the panel has a wide part, a narrow part and a width-changing part, which correspond to a thickness dimension changed from the thickened part to the thinned part. A panel-side edge of the panel-side divided piece has a shape including a curve part corresponding to the thickness dimension, and is sewn with being overlapped in a planar shape to the panel.

4 Claims, 12 Drawing Sheets

A VIEW SEEN IN A
DIRECTION OF AN
ARROW VIIB

AIRBAG

CROSS-REFERENCE TO RELATED APPLICATIONS

This application is based upon and claims the benefit of priority from prior Japanese patent application No. 2018-064848, filed on Mar. 29, 2018, the entire contents of which are incorporated herein by reference.

TECHNICAL FIELD

The present invention relates to an airbag that is to be used for an airbag device to be mounted to a vehicle, and particularly, to an airbag where panels facing each other are sewn to a tether for changing a thickness upon inflation.

BACKGROUND ART

In the related art, in an airbag of an airbag device to be mounted to a vehicle, a tether configured to couple panels facing each other changes a width dimension so as to change a distance between the facing panels when changing a thickness upon completion of inflation (for example, refer to Patent Document 1). Also, the tether is configured by two divided pieces which are divided along a facing direction of the facing panels, and the respective divided pieces are sewn to the panels and to each other. Each of the divided pieces has a panel-side edge to be sewn to the panel and a divided piece-side edge for sewing the divided pieces each other, and is configured to change a distance between the panel-side edge and the divided piece-side edge.

Patent Document 1: JP-A-2014-19193

According to the airbag of the related art, each divided piece is configured to change the width dimension between the panel-side edge and the divided piece-side edge but the panel-side edge and the divided piece-side edge have a linear shape. Therefore, when a thickness of the airbag upon completion of the inflation is changed from a thickened part to a thinned part, the change is simply a linear change and is not a curve change. For this reason, when sewing the panel-side edge and the divided piece-side edge of the divided piece, the edges can be easily sewn with being overlapped in a planar shape by a two-dimensional sewing or the like. However, upon completion of the inflation, when the thickness of the airbag changes in a curve shape from the thickened part to the thinned part, it is necessary to form an edge of the divided piece in a curve shape. Thereby, it may be difficult to perform the two-dimensional sewing, so that the operability of the sewing operation may be lowered.

The present invention has been made in view of the above situations, and an object thereof is to provide an airbag that can be easily formed without lowering operability of a sewing operation even when a tether for changing a thickness from a thickened part to a thinned part in a curve shape is provided.

SUMMARY OF INVENTION

According to an aspect of the invention, there is provided an airbag where panels, which face each other, of an outer peripheral wall upon inflation are configured to change a thickness of the airbag from a thickened part of which a thickness is made to be thick to a thinned part of which a thickness is made to be thin by a tether coupled to the panels, wherein the tether between the panels in a thickness-changing region where the thickness of the airbag is changed from the thickened part to the thinned part is divided into a plurality of pieces along a direction in which the panels face each other, and is thus configured by a plurality of divided pieces to be sewn each other at a linear sewing line, wherein a panel-side divided piece, which is one of the divided pieces and which is sewn to at least one of the panels in the thickness-changing region has, as a width dimension from the linear sewing line with another divided piece adjacent to the panel-side divided piece, a wide part, a narrow part and a width-changing part continued from the wide part to the narrow part, which correspond to a thickness dimension changed from the thickened part to the thinned part, and wherein a panel-side edge, which is sewn to the at least one of the panels, of the panel-side divided piece has a shape including a curve part corresponding to the thickness dimension changed from the thickened part to the thinned part, and is sewn with being overlapped in a planar shape to the at least one of the panels.

DESCRIPTION OF EMBODIMENTS

Figure 1:
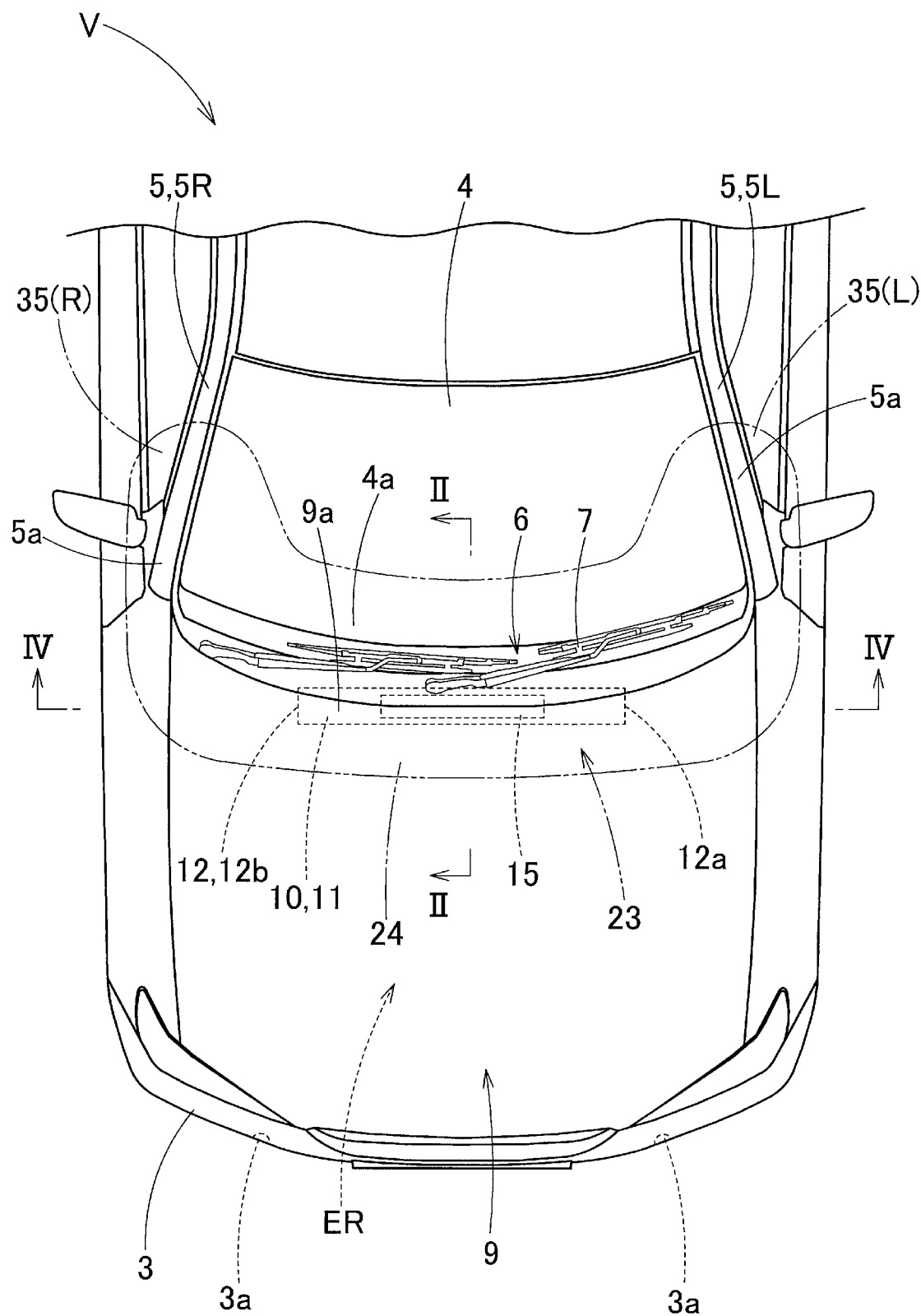
FIG. 1 is a schematic partial plan view of a vehicle to which an airbag device for pedestrian, in which an airbag of an illustrative embodiment of the present invention is used, is mounted, depicting the airbag upon completion of the inflation with a dashed-two dotted line.
Figure 2:
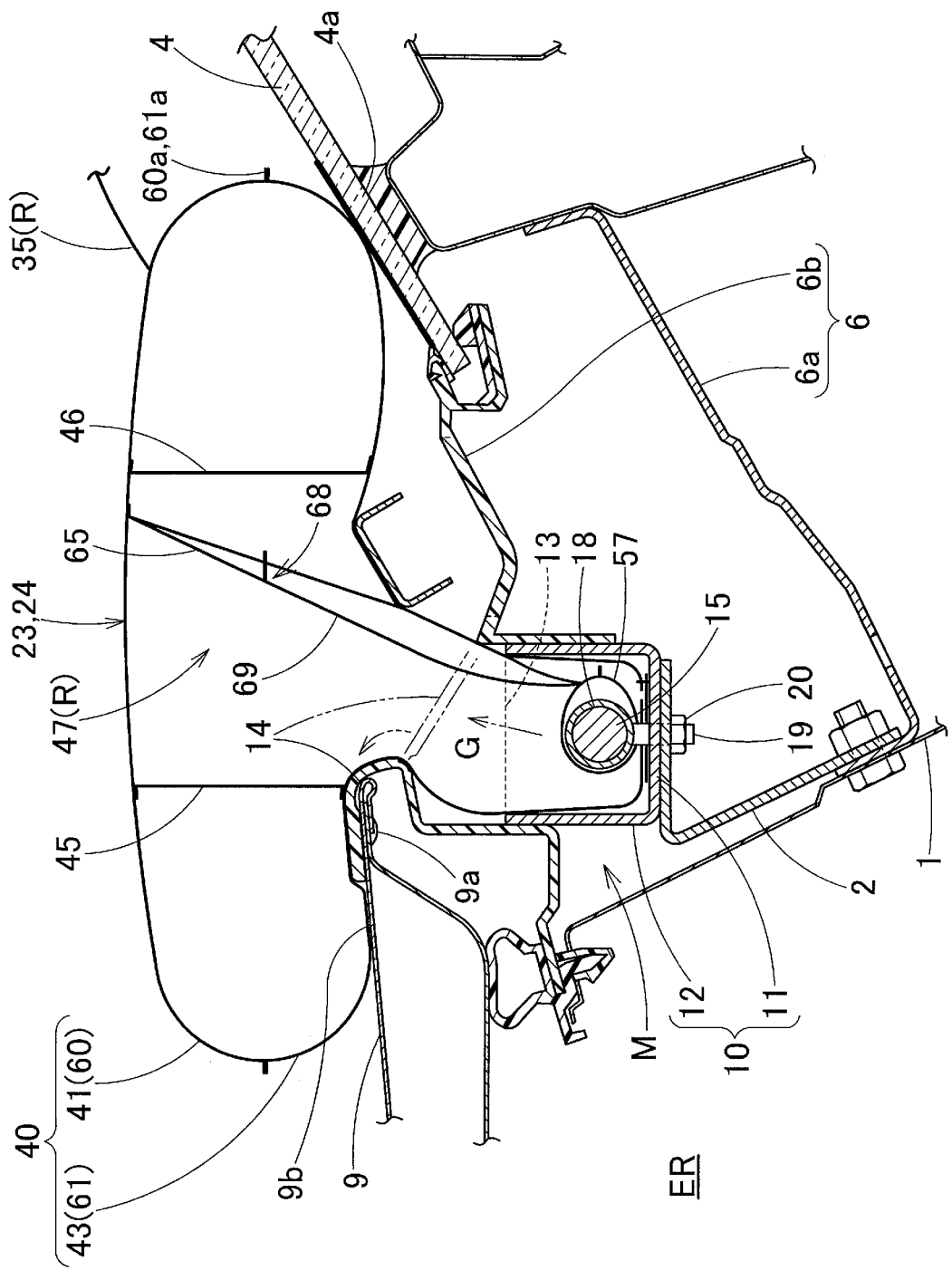
FIG. 2 is a schematic longitudinal sectional view taken along a line II-II of FIG. 1, when the airbag device for pedestrian of the illustrative embodiment is activated.

Hereinafter, an illustrative embodiment of the present invention will be described with reference to the drawings. As shown in FIGS. 1 and 2, an airbag 23 of an illustrative embodiment is used for an airbag device for pedestrian (hereinafter, appropriately abbreviated as "airbag device") M. The airbag device M is mounted to a front edge-side of a cowl 6 in an engine room ER below a rear end 9a of a hood panel 9 of a vehicle V, and includes the airbag 23, an inflator 15 configured to supply an inflation gas G into the airbag 23, and a case 10 configured to accommodate therein the folded airbag 23.

In the specification, the front and rear/upper and lower/right and left directions coincide with the front and rear/upper and lower/right and left directions of the vehicle V, unless particularly mentioned.

Also, a reference numeral 7 of FIG. 1 indicates a wiper. The cowl 6 is configured by a cowl panel 6a made of metal having high stiffness and a cowl louver 6b made of synthetic resin having lower stiffness than the cowl panel 6a.

Figure 4:
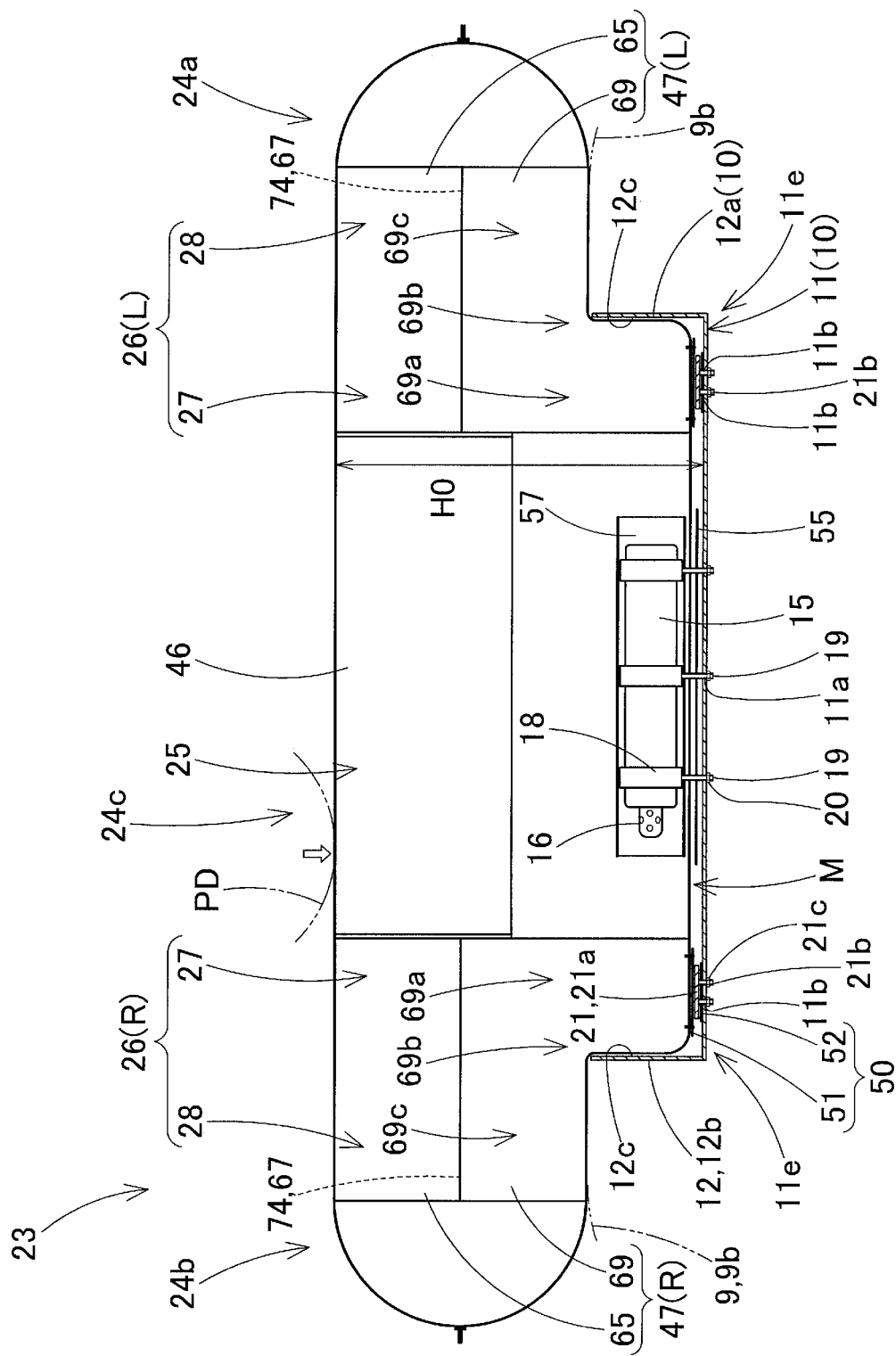
FIG. 4 is a schematic longitudinal sectional view taken along a line IV-IV of FIG. 1, when the airbag device for pedestrian of the illustrative embodiment is activated.

The case 10 of the airbag device M is made of metal (plate), and is fastened and fixed to an attachment part 2, which is configured by a flange and the like extending from a hood ridge reinforcement provided at a body 1-side of the vehicle V, by using bolts 19 of attachment brackets 18 of the inflator 15 and nuts 20. The case 10 has a substantially cuboid box shape having an opening 13 provided at an upper part so as for the airbag 23 to protrude therethrough upon the inflation, and includes a rectangular plate-shaped bottom wall part 11 extending in the right and left direction of the vehicle V and a sidewall part 12 extending upward from an outer peripheral edge of the bottom wall part 11 and having a substantial square tube shape. The case 10 is mounted to a front upper position of the cowl 6 extending forward from the lower of a front end 4a-side of a front windshield 4 (which is also referred to as a front glass. Hereinafter, it is simply referred to as a windshield). As shown in FIG. 4, the bottom wall part 11 of the case 10 has attachment holes 11a through which the respective bolts 19 of the attachment brackets 18 pass and two attachment holes 11b, which are arranged in the vicinity of each of right and left edges of the bottom wall part 11. Through the respective attachment holes 11b, bolts 21b of attachment tools 21 for attaching the airbag 23 to the bottom wall part 11 pass.

Figure 11:
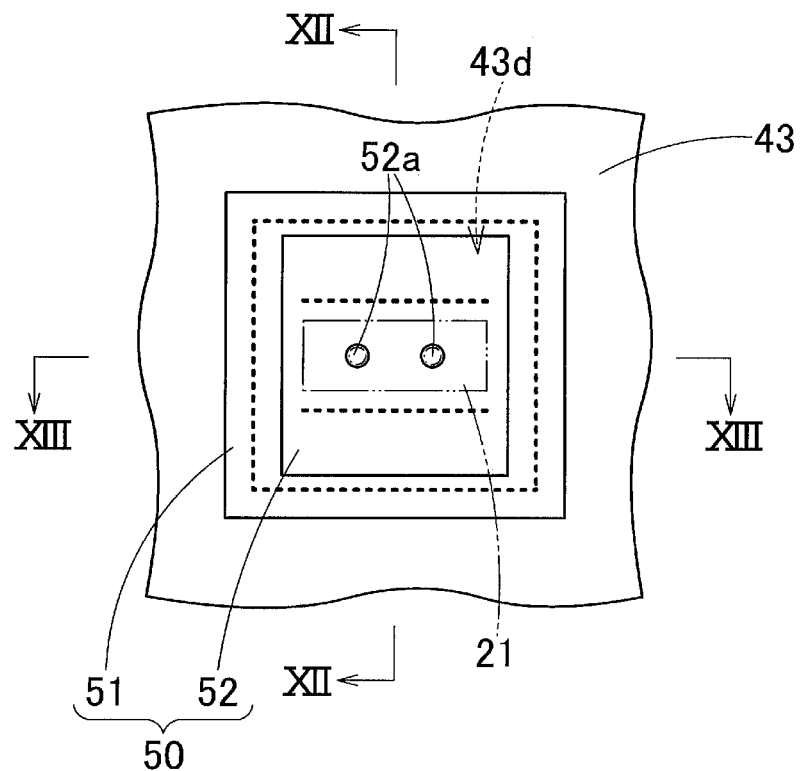
FIG. 11 is a view depicting an attachment member at which an attachment tool, which is to be attached to the airbag of the illustrative embodiment, is arranged.
Figure 12:
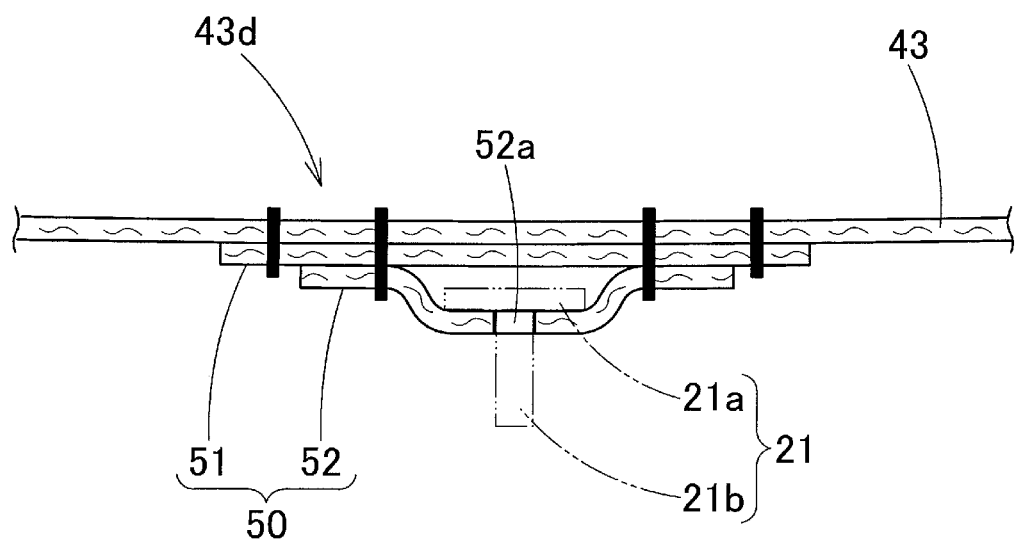
FIG. 12 is a schematic sectional view taken along a line XII-XII of FIG. 11.
Figure 13:
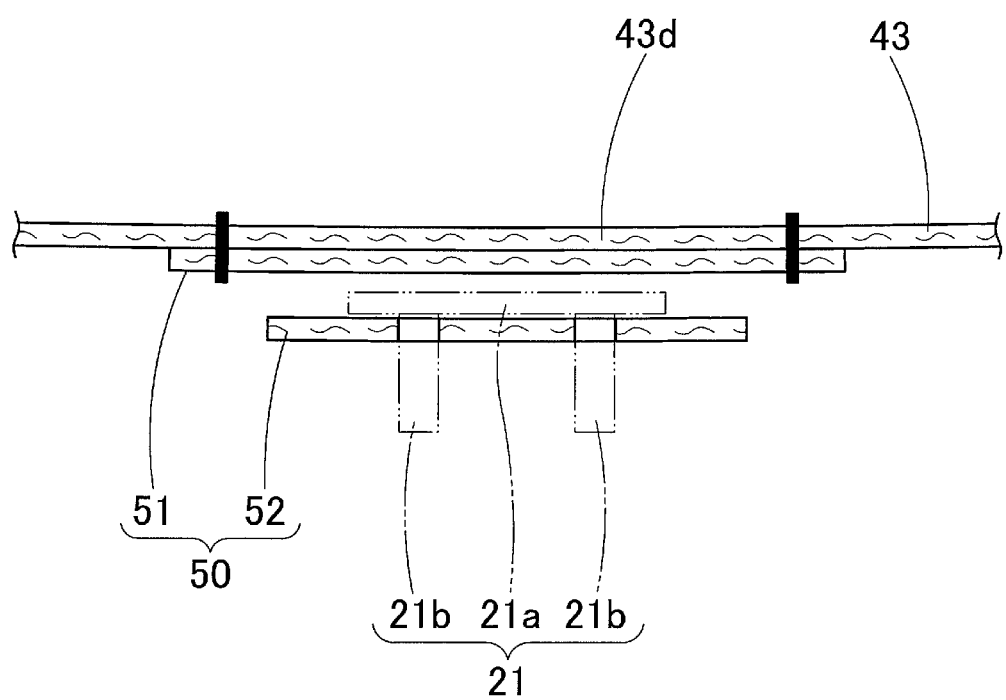
FIG. 13 is a schematic sectional view taken along a line XIII-XIII of FIG. 11.

In the meantime, as shown with the dashed-two dotted line in FIGS. 11 to 13, the attachment tool 21 has a substantially rectangular metallic (plate) substrate 21a and the two bolts 21b protruding from a lower surface of the substrate and arranged thereon in the right and left direction. The attachment tool 21 is attached to an attachment member 50 sewn to a case-side panel 43 of the airbag 23, which will be described later. As shown in FIG. 4, each bolt 21b is inserted into the attachment hole 11b of the bottom wall part 11 of the case 10 and is fastened with a nut 21c, so that the case-side panel 43 is attached to the bottom wall part 11 of the case 10 by using the attachment tool 21.

Making an additional remark, the attachment member 50 has a substantially rectangular sheet-shaped reinforcement fabric 51, which is to be sewn to a lower surface of the case-side panel 43, and a substantially rectangular sheet-shaped attachment main body fabric 52 configured to cover the lower surface of the substrate 21a of the attachment tool 21 and to be sewn to the reinforcement fabric 51 and the case-side panel 43. The attachment main body fabric 52 is formed with through-holes 52a so as for the two bolts 21b of the attachment tool 21 to protrude downward therethrough.

Figure 5:
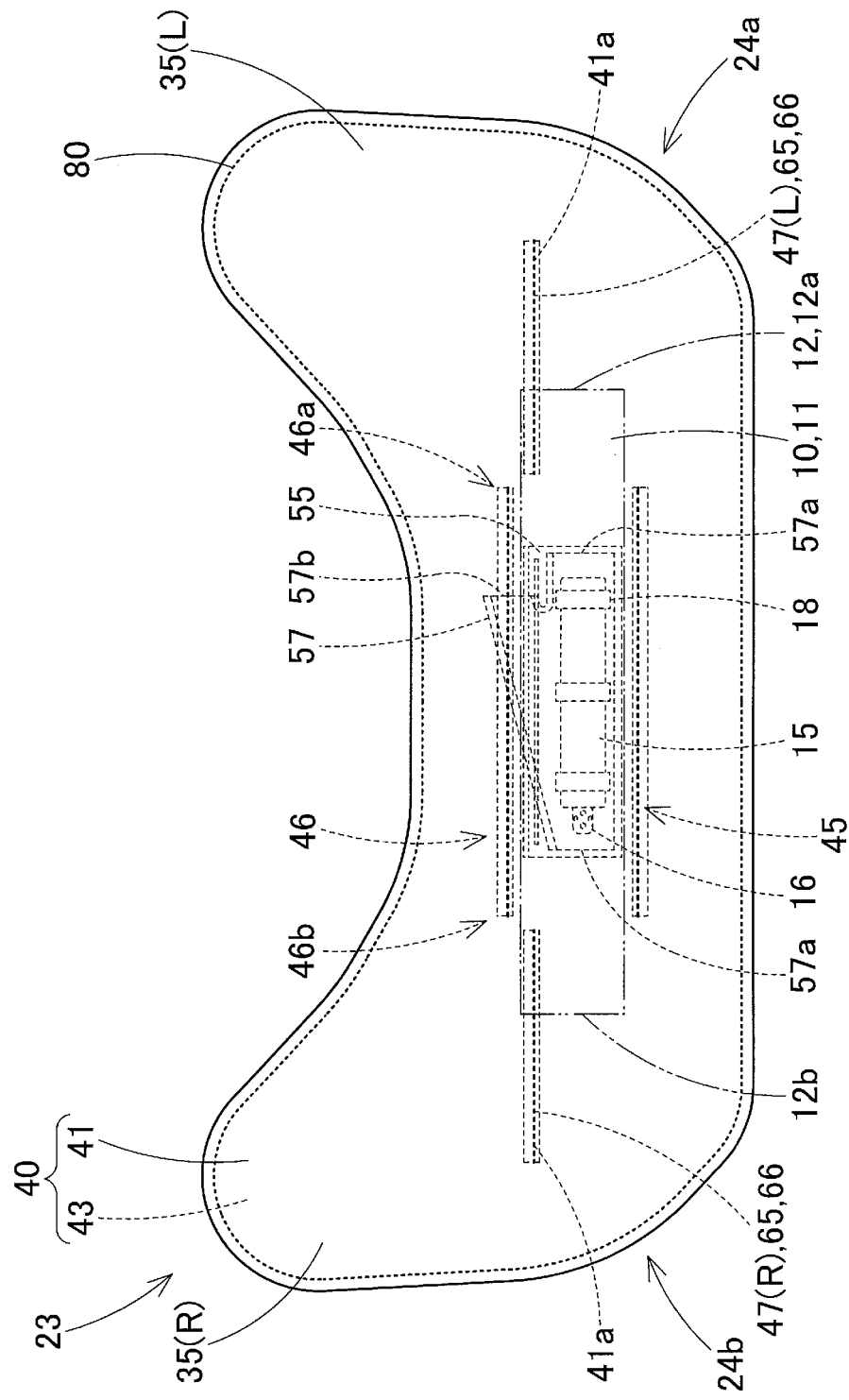
FIG. 5 is a plan view depicting a state where the inflator is inserted in the airbag of the illustrative embodiment.

As shown in FIG. 5, the inflator 15 has a circular column shape of which an axial direction is arranged in the right and left direction of the vehicle V, and a gas discharge part 16 configured to discharge an inflation gas is arranged at a tip end thereof. The inflator 15 is held by the plurality of (three, in the illustrative embodiment) attachment brackets 18, is inserted in the airbag 23 with being surrounded by an inner tube 57, and is fixed to the bottom wall part 11 of the case 10 by using the bolts 19 of the attachment brackets 18 (refer to FIGS. 2 and 3). As described above, the bolts 19 of the attachment brackets 18 pass through the bottom wall part 11 and are fastened to the attachment part 2 at the body 1-side of the vehicle V by the nuts 20, so that the case 10 is fixed to the attachment part 2 together with the inflator 15 and the airbag 23 having the inflator 15 inserted therein is also attached and fixed to the bottom wall part 11 of the case 10 by using the inflator 15.

In the illustrative embodiment, a sensor 3a capable of detecting collision with a pedestrian is arranged at a front bumper 3 of the vehicle V. When an activation circuit (not shown) to which a signal from the sensor 3a is to be input detects collision with a pedestrian on the basis of the signal from the sensor 3a, it activates the inflator 15 of the airbag device M.

As shown in FIGS. 1 to 6, the airbag 23 has a main body part 24 configured to cover an upper region ranging from the rear end 9a of the hood panel 9 to the cowl 6 and the front edge 4a of the windshield 4 upon completion of the inflation and pillar cover parts 35(L, R) extending backward from both left and right ends 24a, 24b of the main body part 24 and configured to cover an upper region of left and right front pillars 5(5L, 5R). An outer peripheral wall 40 of the airbag 23 has a non-case-side panel 41 configured to receive a pedestrian at an upper surface-side, and a case-side panel 43 configured to be supported to the hood panel 9, the windshield 4 and the front pillars 5 at a lower surface-side. In the illustrative embodiment, as shown in FIG. 8, the non-case-side panel 41 and the case-side panel 43 are made of base fabrics 60, 61 for airbag of which outer shapes are the same, and the outer peripheral wall 40 of the airbag 23 is formed by overlapping the base fabrics 60, 61 for airbag and sewing outer peripheral edges 60a, 61a thereof.

Also, the airbag 23 has a front tether 45 and a rear tether 46 arranged at the front and the rear of a center of the main body part 24 and tethers 47(L, R) for thickness change arranged at both the left and right ends 24a, 24b of the main body part 24 so as to restrain a spaced distance between the non-case-side panel 41 and the case-side panel 43 of the main body part 24, i.e., a thickness dimension of the main body part 24 upon completion of the inflation. Upon completion of the inflation, a central portion 24c of the main body part 24 in the right and left direction is configured as a thickened part (a general thickened part) 25 and both the left and right ends 24a, 24b are configured as thickness-changing regions 26(L, R) where the thickness of the airbag 23 is changed from a thickened part 27 equivalent to the general thickened part 25 to a thinned part 28 of which a thickness dimension is smaller than that of the thickened part 27.

Figure 8:
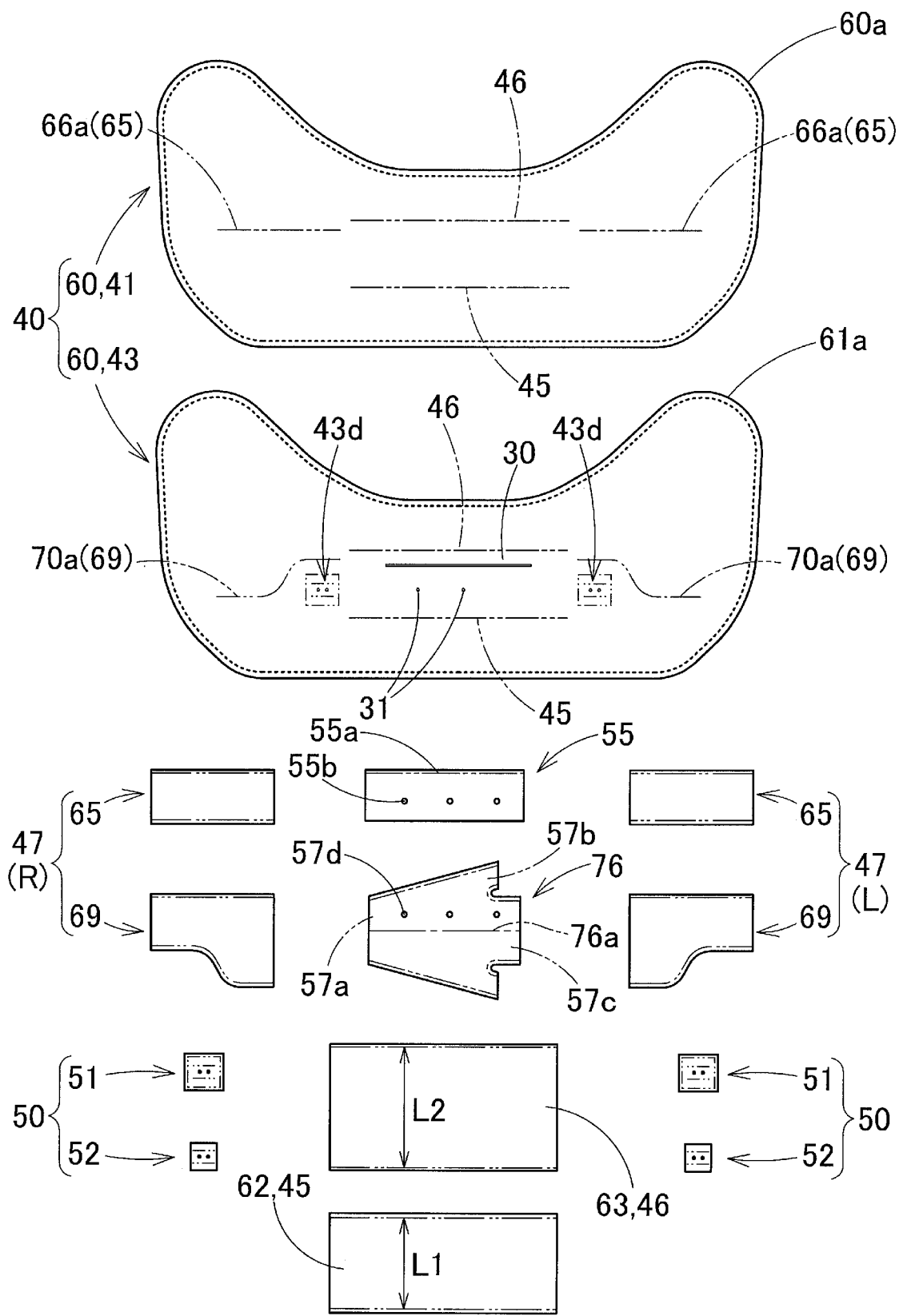
FIG. 8 is a plan view depicting constitutional members of the airbag of the illustrative embodiment.

As shown in FIGS. 2 and 8, the front tether 45 and the rear tether 46 have a band shape of which a width dimension in the upper and lower direction is constant, respectively, and are respectively configured by each of the base fabrics 62, 63 for tether. In the illustrative embodiment, the front tether 45 is configured so that, when the base fabric 62 for tether is joined to the non-case-side panel 41 and the case-side panel 43 by sewing, a spaced distance L1 (refer to FIG. 8) between the panels 41, 43 is about 150 mm, and the rear tether 46 is configured so that, when the base fabric 63 for tether is joined to the non-case-side panel 41 and the case-side panel 43 by sewing, a spaced distance L2 (refer to FIG. 8) between the panels 41, 43 is about 170 mm.

Figure 6:
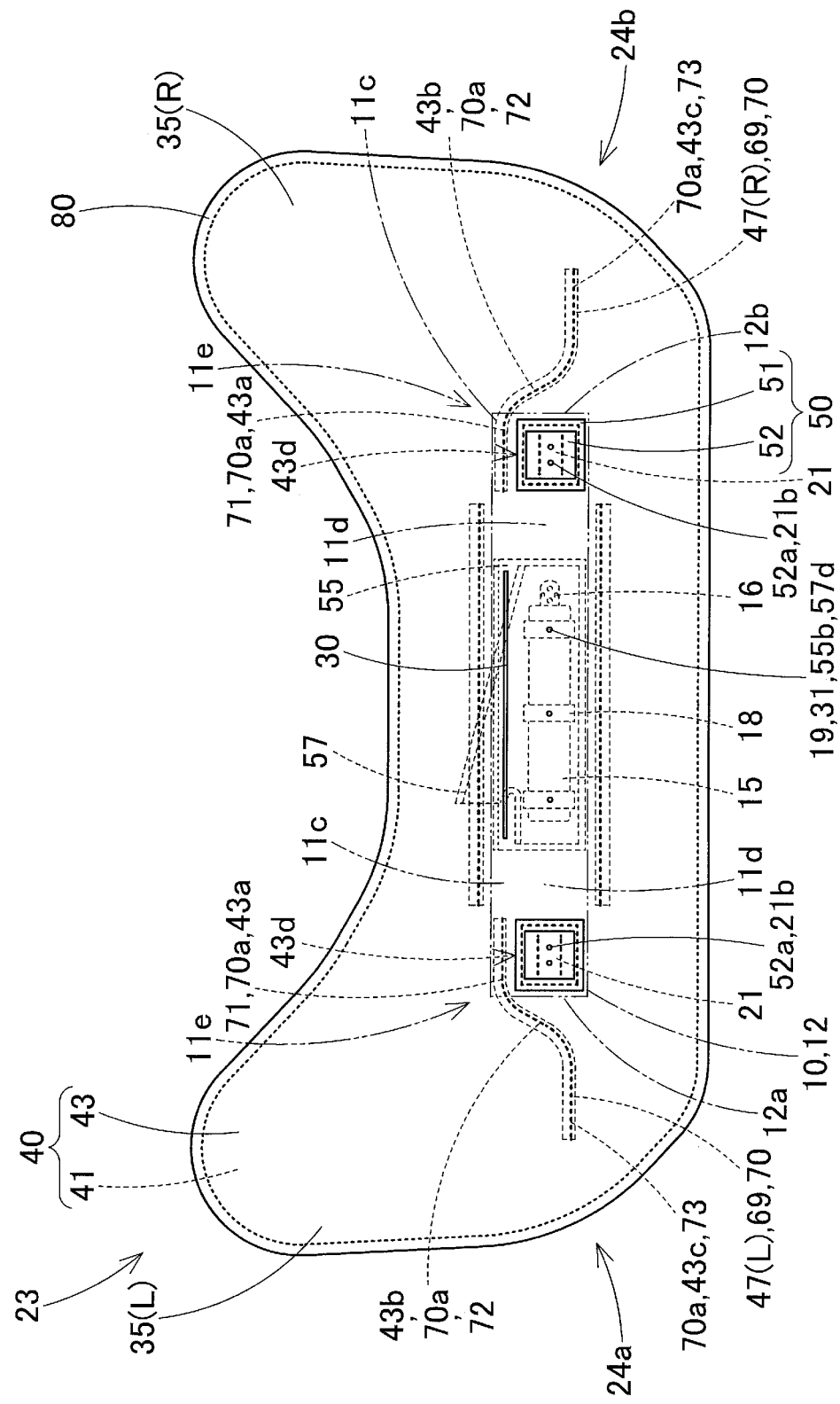
FIG. 6 is a bottom view depicting the state where the inflator is inserted in the airbag of the illustrative embodiment.

In the meantime, the inflator 15 is accommodated between the front tether 45 and the rear tether 46 in the airbag 23 (refer to FIGS. 5 and 6). The front tether 45 and the rear tether 46 are arranged in a state where the width dimension in the right and left direction is smaller than an entire length of the main body part 24 in the right and left direction so as to enable the inflation gas from the inflator 15 to flow forward and backward from both the left and right ends. Also, the front tether 45 and the rear tether 46 are arranged at positions deviating forward and backward from the case 10 in the airbag 23 upon completion of the inflation but are arranged so that the central portion 24*c* of the main body part 24 above the bottom wall part 11 of the case 10 is configured as the general thickened part 25 for receiving a pedestrian being pushed toward the upper of the cowl 6.

The tethers 47(L, R) for thickness change are arranged in the thickness-changing regions 26(L, R) from the thickened part 27 to the thinned part 28 of the main body part 24 of the airbag 23 upon completion of the inflation and are respectively divided into a plurality of (two, in the illustrative embodiment) pieces along the upper and lower direction of a facing direction of the non-case-side panel 41 and the case-side panel 43 facing each other, so that the tethers are respectively formed by a plurality of (two, in the illustrative embodiment) divided pieces sewn to each other along linear sewing lines 68, i.e., in the illustrative embodiment, a divided piece (a panel-side divided piece) 65 at the non-case-side panel 41-side and a divided piece (a panel-side divided piece) 69 at the case-side panel 43-side. In the illustrative embodiment, the tether 47L for thickness change and the tether 47R for thickness change are bilaterally symmetric and the divided pieces 65 and the divided pieces 69 configuring the tethers 47L, 47R are also bilaterally symmetric to each other, respectively.

Figure 7A:
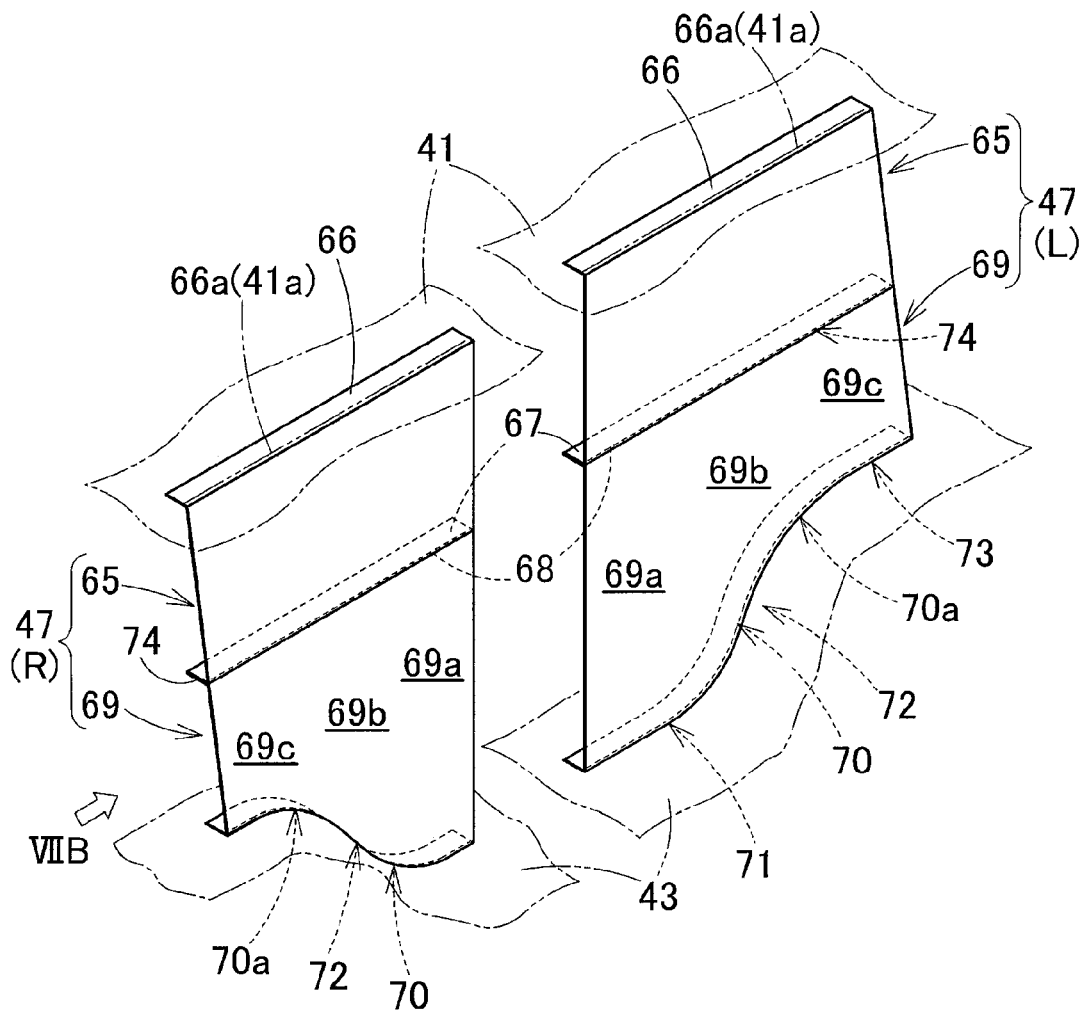
FIG. 7A is a schematic perspective view of tethers arranged in a thickness-changing region of the airbag of the illustrative embodiment.
Figure 7B:
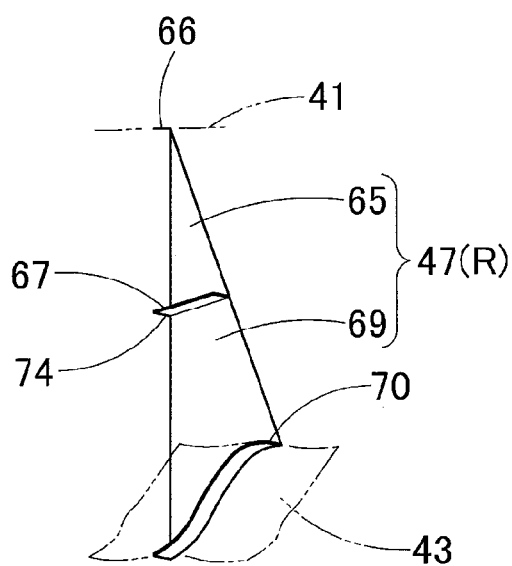
FIG. 7B is a view as seen in a VIIB arrow direction in FIG. 7A.
Figure 10:
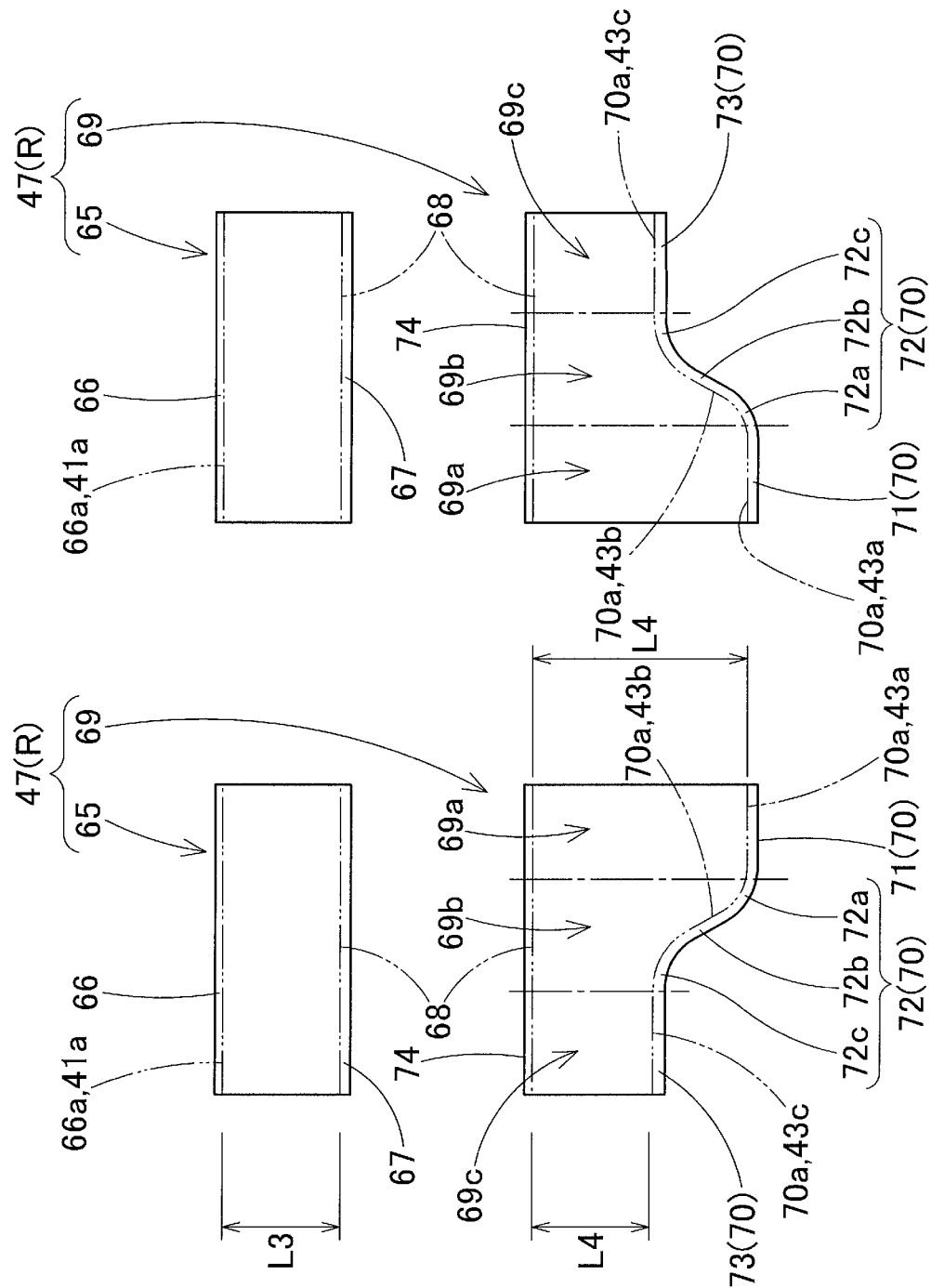
FIG. 10 is a plan view of divided pieces configuring tethers for thickness change of the illustrative embodiment.

As shown in FIG. 10, the divided piece 69 to be sewn to the case-side panel 43 has, as a width dimension from the linear sewing line 68 with the adjacent divided piece 65, a wide part 69*a*, a narrow part 69*c* and a width-changing part 69*b* continued from the wide part 69*a* to the narrow part 69*c*, which correspond to a thickness dimension changed from the thickened part 27 to the thinned part 28. Also, as shown in FIGS. 7A and 7B, a panel-side edge 70, which is to be sewn to the case-side panel 43, of the panel-side divided piece 69 has a shape including a curve part 72 corresponding to the thickness dimension changed from the thickened part 27 to the thinned part 28. Specifically, the panel-side edge 70 has a wide linear part 71 of an edge of the wide part 69*a*, a narrow linear part 73 of an edge of the narrow part 69*c* and an inclined curve part 72 arranged between the wide linear part 71 and the narrow linear part 73 and becoming an edge of the width-changing part 69*b*. Also, the inclined curve part 72 has a curve portion 72*a* bent upward in a circular arc shape from the wide linear part 71, a curve portion 72*c* bent downward in a circular arc shape from the narrow linear part 73 and a linear portion 72*b* for interconnecting the curve portion 72*a* and the curve portion 72*c*. In the meantime, a divided piece-side edge 74 to be joined to the adjacent divided piece 65 has a linear shape extending in the right and left direction, in parallel with the sewing line 68.

The divided piece 65 to be sewn to the non-case-side panel 41 has a band shape of which a width dimension is constant, and a panel-side edge 66 to be sewn to the panel 41 and a divided piece-side edge 67 to be sewn to the divided piece 69 have linear shapes extending in the right and left direction and are parallel with each other.

In the meantime, as shown in FIGS. 5 and 8, sewing portions 41*a* of the non-case-side panel 41, to which the panel-side edges 66 of the divided pieces 65 are to be sewn, are arranged at a slightly front side of both left and right sides of the rear tether 46 and are configured as linear portions along the right and left direction.

Figure 9:
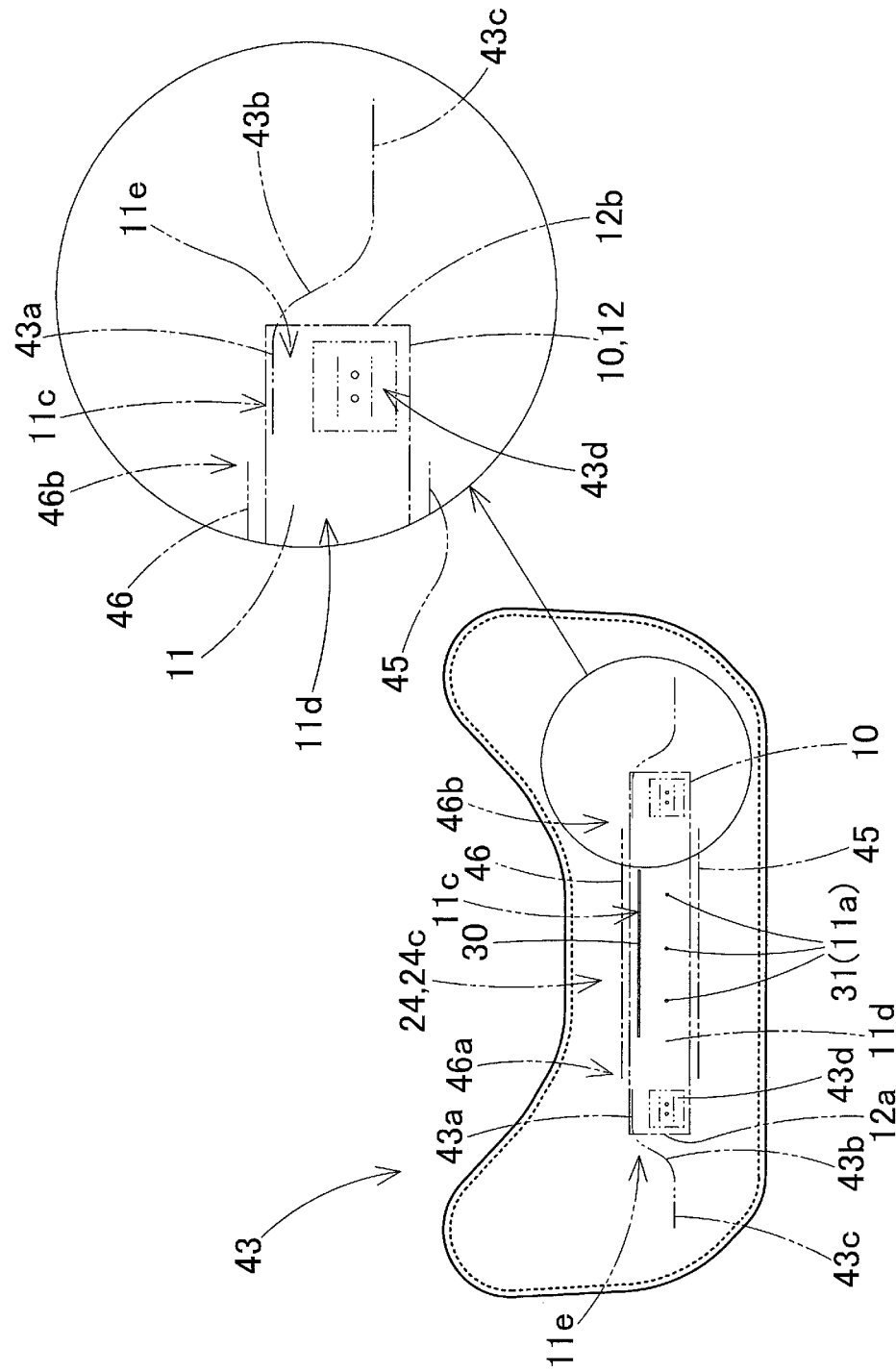
FIG. 9 is a plan view and a partial enlarged view of a case-side panel of the airbag of the illustrative embodiment.

As shown in FIG. 9, a sewing portion 43*a* of the case-side panel 43, to which the wide linear part 71 of the panel-side edge 70 of the divided piece 69 is to be sewn, is configured as a linear portion, which deviates outward in the right and left direction from each of left and right end portions 46*a*, 46*b* of the rear tether 46 at the central portion 24*c* of the main body part 24 and is arranged on the front of the bottom wall part 11 of the case 10, of the case-side panel 43. That is, the sewing portion 43*a* of the case-side panel 43, to which the wide linear part 71 is to be sewn, is configured as a portion along the right and left direction at a rear edge 11*c*-side at the rear of the attachment hole 11*b* of the bottom wall part 11. As shown in FIG. 9, a sewing portion 43*c* of the case-side panel 43, to which the narrow linear part 73 is to be sewn, is configured as a linear portion, which deviates outward in the right and left direction from the case 10 in the vicinity of a center 11*d* of the case 10 in the front and rear direction and is arranged along the right and left direction. A sewing portion 43*b* of the case-side panel 43, to which the inclined curve part 72 is to be sewn, is configured as a curve sewing portion 43*b* continuing from the linear sewing portion 43*a* inside the case 10 to the linear sewing portion 43*c* outside the case 10, i.e., extending outward over a left wall part 12*a* and a right wall part 12*b* of the sidewall part 12 of the case 10.

A flat deployed shape of the sewing portions 43*a*, 43*c*, 43*b* of the case-side panel 43 coincides with a flat deployed shape of a sewing portion 70*a* of the panel-side edge 70 of the divided piece 69 (refer to FIG. 8). Thereby, when the panel-side edge 70 of the divided piece 69 is overlapped with the sewing portions 43*a*, 43*c*, 43*d* of the case-side panel 43 deployed flat, it is possible to perform a two-dimensional sewing operation by a predetermined industrial sewing machine.

Also, the sewing portions 43*a*, 43*b* of the case-side panel 43 for sewing the wide linear part 71 and the inclined curve part 72 of the divided piece 69 are arranged with being offset outward in the right and left direction from the rear side of an arrangement part 43*d* to which the attachment tool 21 is attached so as to bypass the arrangement part 43*d*.

In the illustrative embodiment, as shown in FIG. 10, a substantial width dimension L3 of the divided piece 65 except a seam is set to about 70 mm, and a width dimension L4 of the narrow part 69*c* is set to about 70 mm and a width dimension L5 of the wide part 69*a* is set to about 125 mm, as a substantial width dimension of the divided piece 69 except a seam.

The width dimensions L3, L4, L5 of the divided piece 69 and an edge shape of the inclined curve part 72, in other words, the width dimensions of the wide part 69*a*, the narrow part 69*c* and the width-changing part 69*b* continued from the wide part 69*a* to the narrow part 69*c* are set so that the non-case-side panel 41 makes a height dimension H0 from the bottom wall part 11 be equivalent (constant) from the general thickened part 25 to the thickness-changing region 26(L, R) upon completion of the inflation of the main body part 24 (refer to FIG. 4).

That is, when the tethers 47(L, R) for thickness change configured by sewing the divided pieces 65, 69 to the corresponding panels 41, 43 and sewing the divided pieces 65, 69 each other are arranged and the tethers 45, 46 are arranged at the panels 41, 43, upon completion of the inflation of the airbag 23, the main body part 24 is formed in such a shape that the general thickened part 25 and the thickened part 27 configured by the wide part 69*a* of the thickness-changing region 26(L, R) are arranged in an area on the bottom wall part 11 of the case 10 and the thinned part 28 configured by the narrow part 69c of the thickness-changing region 26(L, R) is arranged at an outer side of the case 10 deviating from the sidewall part 12 along the bottom wall part 11, as shown in FIG. 4.

Figure 3:
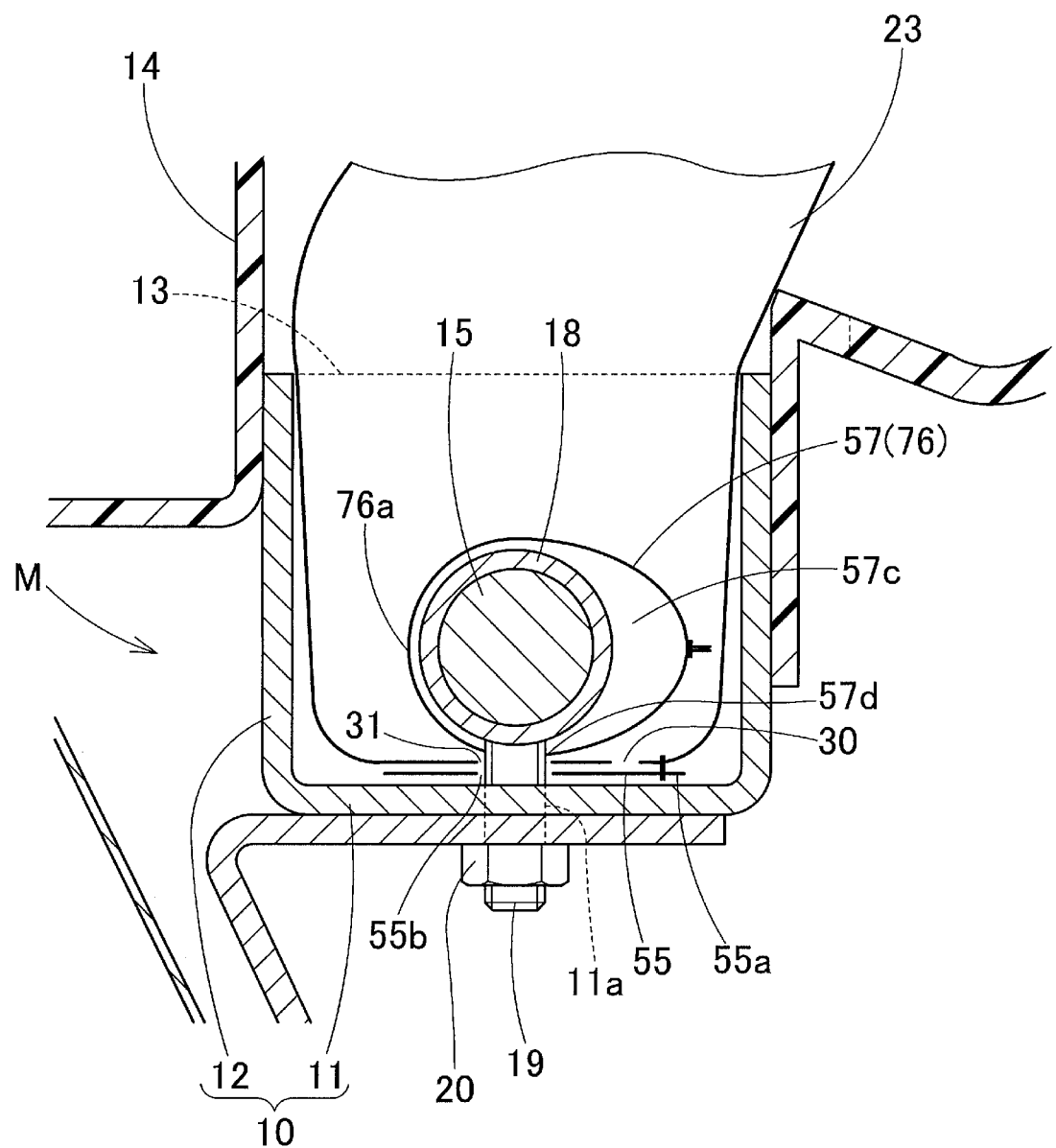
FIG. 3 is a schematic longitudinal sectional view in the vicinity of an inflator when the airbag device for pedestrian of the illustrative embodiment is activated.

Also, as shown in FIGS. 3, 5 and 6, the case-side panel 43 between the front and rear tethers 45, 46 of the main body part 24 of the airbag 23 is provided with a slit 30 extending in the right and left direction and attachment holes 31 through which the bolts 19 of the attachment brackets 18 are to pass. The slit 30 is provided so as to insert the inflator 15 wrapped with the inner tube 57 into the airbag 23, and a cover fabric 33 for covering the slit 30 is arranged on an outer surface of the slit 30.

The cover fabric 33 has a rear edge 33a sewn to the case-side panel 43 at the rear of the slit 30 and attachment holes 33b through which the bolts 19 of the attachment brackets 18 are to pass.

The inner tube 57 is configured as a trifurcate tube shape having an insertion tube part 57c for inserting the inflator 15 having the attachment brackets 18 attached thereto and outlets 57a, 57b extending from the arrangement part of the gas discharge part 16 toward both sides and provided at tip ends for outflow of the inflation gas. The insertion tube part 57c is formed with attachment holes 57d through which the bolts 19 of the attachment brackets 18 are to pass. As shown in FIG. 8, the inner tube 5 is formed of a base fabric 76 for tube. When the base fabric 76 for tube is two-folded on the basis of a folding line 76a and predetermined overlapped outer peripheral edges are sewn to each other, the inner tube 57 can be formed.

In the meantime, the base fabrics 60, 61 for airbag configuring the non-case-side panel 41 and the case-side panel 43, the base fabrics 62, 63 for tether, the divided pieces 65, 69 configuring the tethers 47(L, R) for thickness change, the reinforcement fabric 51 and the attachment main body fabric 52 of the attachment member 50, the base fabric 76 for tube and the cover fabric 33 are respectively made of a woven fabric having flexibility and a sheet shape and composed of polyester yarn, polyamide yarn or the like.

The airbag 23 of the illustrative embodiment can be formed by sewing the base fabrics 62, 63 for tether and the panel-side edges 66 of the divided pieces 65 to the base fabric 60 for airbag (the non-case-side panel 41), sewing the panel-side edges 70 of the divided pieces 69 to the base fabric 61 for airbag (the case-side panel 43), sewing the divided piece-side edges 67, 74 of the divided pieces 65, 69 each other, overlapping and flattening the base fabrics 60, 61 for airbag and sewing the outer peripheral edges 60a, 61a each other, sewing the base fabrics 62, 63 for tether to the base fabric 61 for airbag and sewing the remaining outer peripheral edges 60a, 61a of the base fabrics 60, 61 for airbag with a sewing thread 80 (refer to FIG. 5). In the meantime, the base fabric 61 for airbag configuring the case-side panel 43 is formed with the slit 30 and the attachment holes 31 in advance, the cover fabric 33 is sewn at a predetermined position and the attachment tool 21 is attached to a position of the attachment part (the arrangement part) 43d on the lower surface of each of the left and right sides of the attachment holes 31. The attachment tool 21 can be attached by arranging the substrate 21a of which the bolts 21b protrude from the through-holes 52a between the reinforcement fabric 51 and the attachment main body fabric 52 of the attachment member 50 and sewing predetermined outer peripheral edge portions of the attachment main body fabric 52 and the reinforcement fabric 51 to the attachment part 43d of the base fabric 61 for airbag configuring the case-side panel 43.

In the meantime, even though the panel-side edge 70 of the divided piece 69 includes the inclined curve part 72, it is possible to sew the panel-side edge 70 to the sewing portions 43a, 43b, 43c of the case-side panel 43 by the two-dimensional sewing operation, so that it doesn't take time to sew the divided piece 69 to the case-side panel 43. Also, it doesn't take time to sew the divided pieces 65, 69 each other because the divided piece-side edges 67, 74 are respectively formed to have a linear shape and are sewn to each other at the sewing lines 68 formed to have a linear shape. Also, it doesn't take time to perform the sewing operation for the panel-side edge 66 of the divided piece 65 because the panel-side edge 66 is formed to have a linear shape and can be thus linearly sewn to the linear sewing portion 41a of the non-case-side panel 41.

Then, the airbag 23 is folded to be accommodated in the case 10 and the inflator 15 inserted in the inner tube 57 and having the attachment brackets 18 attached thereto is inserted into the airbag 23 through the slit 30. Then, the bolts 19 of the attachment brackets 18 are arranged to protrude from the attachment holes 57d of the inner tube 57 and the attachment holes 31 of the airbag 23 and the attachment holes 33b of the cover fabric 33 are fitted with the bolts 19 so that the cover fabric 33 can cover the slit 30, thereby forming an airbag assembly. The airbag assembly is accommodated in the case 10, the bolts 19, 21b are arranged to protrude downward from the bottom wall part 11 of the case 10, and the bolts 21b are fastened with the nuts 21c, so that the attachment tools 21 are fixed to the bottom wall part 11 of the case 10. Then, an airbag cover 14 is attached to the case 10 so that the opening 13 of the case 10 is to be covered. Then, the case 10 is arranged at a predetermined position of the vehicle V, the bolts 19 protruding from the case 10 are fastened to the attachment part 2 with the nuts 20, and a signal line for activation extending from the inflator 15 is connected to the predetermined activation circuit, so that the airbag device M is mounted to the vehicle V.

Thereafter, when an activation signal is input to the inflator 15, the inflation gas G is discharged from the gas discharge part 16, so that the folded airbag 23 is deployed and inflated to push and open the airbag cover 14, the main body part 24 of the airbag 23 covers an upper surface 9b of the rear end 9a of the hood panel 9 and the upper of the cowl 6/the front end 4a of the windshield 4, and the pillar cover parts 35(L, R) cover upper surfaces 5a of the front pillars 5 (refer to the dashed-two dotted line in FIG. 1 and FIGS. 2 and 4).

According to the airbag 23 of the illustrative embodiment, at least one divided piece 69 of the panel-side divided pieces 65, 69 arranged in the thickness-changing regions 26(L, R) has the width dimension having the wide part 69a, the narrow part 69c and the width-changing part 69b and is provided with the panel-side edge 70 including the curve part (the inclined curve part) 72. However, the panel-side edge 70 including the curve part 72 is sewn with being overlapped in a planar shape to the corresponding case-side panel 43 by the two-dimensional sewing, so that it doesn't take time to perform the sewing operation. Also, since the divided piece-side edges 67, 74 of the panel-side divided piece 69 and the divided piece 65 adjacent thereto are sewn to each other at the linear sewing line 68, it doesn't take time to sew the divided pieces 65, 69 each other. When the airbag 23 having the tethers 47(L, R) for thickness change consisting of the divided pieces 65, 69 inflates, since the panel-side divided pieces 69 of the width dimension having the wide part 69a, the narrow part 69c and the width-changing part 69b are arranged in the thickness-changing regions 26(L, R), it is possible to complete the inflation in a state where the thickness has changed from the thickened part 27 to the thinned part 28 in a predetermined curve shape in the thickness-changing regions 26(L, R).

Therefore, in the airbag 23 of the illustrative embodiment, even when the tethers 47(L, R) for changing the thickness from the thickened part 27 to the thinned part 28 in the curve shape are provided, it is possible to easily manufacture the airbag without lowering the operability of the sewing operation.

Also, the airbag 23 of the illustrative embodiment is accommodated with being folded in the case 10 having the bottom wall part 11 and the sidewall part 12 extending from the peripheral edge of the bottom wall part 11. Upon completion of the inflation, the thickened parts 27 of the thickness-changing regions 26(L, R) are arranged to continue to the general thickened part 25 arranged at the side spaced from the thinned parts 28, upon completion of the inflation, the general thickened part 25 and the thickened parts 27 of the thickness-changing regions 26(L, R) are arranged in the area on the bottom wall part 11 of the case 10, and upon completion of the inflation, the thinned parts 28 of the thickness-changing regions 26(L, R) are arranged at the outer side of the case 10 deviating from the sidewall part 12 along the bottom wall part 11 (refer to FIG. 4).

For this reason, in the airbag 23 of the illustrative embodiment, upon completion of the inflation, the thickened parts 27 of the thickness-changing regions 26(L, R) are arranged at the inner side of the case 10, the thinned parts 28 are arranged at the outer side of the case 10, and the curve parts (the inclined curve parts) 72 corresponding to the thickness change from the thickened parts 27 to the thinned parts 28 are arranged to span the left wall part 12*a* and the right wall part 12*b* of the sidewall part 12 of the case 10, so that the thickened parts 27 of the airbag 23 are stably supported to the inner peripheral surface 12*c* of the sidewall part 12 of the case 10. For this reason, when the airbag 23 after completion of the inflation receives a pedestrian PD who is a protection target, the airbag is stably supported to the case 10 and thus can smoothly receive and hold the pedestrian PD without the deviation.

Also, in the airbag 23 of the illustrative embodiment, one panel 43 of the panels 41, 43 facing each other is configured as the case-side panel 43 to be attached to the case 10, and the other of the panels 41, 43 facing each other is configured as the non-case-side panel 41. The panel-side divided piece 69 to be sewn to the case-side panel 43 is configured so that the height dimension H0 from the bottom wall part 11 of the non-case-side panel 41 is to be equivalent (constant) from the general thickened part 25 to the thickness-changing region 26(L, R) upon completion of the inflation (refer to FIG. 4). That is, the divided piece 69 has, as the width dimension from the linear sewing line 68 with the adjacent divided piece 65, the wide part 69*a*, the narrow part 69*c* and the width-changing part 69*b* continued from the wide part 69*a* to the narrow part 69*c*, and the panel-side edge 70 is sewn to the case-side panel 43 with being overlapped in the planar shape, as the shape including the curve part (the inclined curve part) 72 corresponding to the thickness dimension changed from the thickened part 27 to the thinned part 28.

For this reason, in the illustrative embodiment, upon completion of the inflation of the airbag 23, the non-case-side panel 41 can be arranged in the planar shape where the height dimension H0 from the bottom wall part 11 of the case 10 is substantially constant, including the thickened part 27 and the thinned part 28. Therefore, the above configuration is favorable to the airbag 23 that receives the pedestrian PD who is a protection target at the wide planar region of the non-case-side panel 41 after completion of the inflation.

Also, in the airbag 23 of the illustrative embodiment, the attachment tool 21 for attaching the airbag 23 to the bottom wall part 11 of the case 10 is arranged at the part 43*d* of the case-side panel 43 in the thickness-changing region 26(L, R), and the panel-side edge 70 of the panel-side divided piece 69 is sewn to the case-side panel 43 in the shape including the inclined curve part 72 to bypass the arrangement part 43*d* to which the attachment tool 21 is attached.

For this reason, in the illustrative embodiment, the case-side panel 43 that is attached to the case 10 by the attachment tools 21 sews the tethers 47(L, R), which form the thickness-changing regions 26(L, R), to an area of the attachment part thereof, i.e., an area 11*e* in the vicinity of the attachment holes 11*b*, 11*b* of the bottom wall part 11 at which the arrangement parts 43*d* are arranged (refer to FIGS. 4 and 6). Therefore, the thickness dimensions of the thickness-changing regions 26(L, R) upon completion of the inflation can be set as the height dimension H0 from the bottom wall part 11, on the basis of the bottom wall part 11 of the case 10, and can be thus correctly secured. Also, since the panel-side edge 70 of the panel-side divided piece 69 that is to be sewn to the case-side panel 43 is arranged in an area (the rear edge 11*c*-side of the bottom wall part 11) at which it does not interfere with the attachment tool 21, the panel-side edge 70 can be smoothly sewn to the case-side panel 43.

In the illustrative embodiment, it has been described that the airbag 23 is used for the airbag device M for pedestrian. However, the present invention can be applied to an airbag for an airbag device for front passenger seat and the like inasmuch as the airbag has a configuration where upon the inflation, the facing panels of the outer peripheral wall are configured to change the thickness of the airbag from the thickened part of which a thickness is made to be thick to the thinned part of which a thickness is made to be thin in the curve shape by the tethers coupled to the panels.

Also, according to the airbag 23 of the illustrative embodiment, upon completion of the inflation, the thickness-changing regions 26(L, R) are arranged at both sides. However, the thickness-changing region may be arranged at one place or at three or more places of the airbag upon completion of the inflation.

Also, according to the airbag 23 of the illustrative embodiment, the tether 47 configured to couple the facing panels 41, 43 of the thickness-changing region 26 is configured by the two divided pieces 65, 69. However, the tether may be configured by three or more divided pieces as long as the divided pieces can be sewn at the linear sewing line.

Also, according to the airbag 23 of the illustrative embodiment, the divided piece 69 that is to be sewn to one of the facing panels 41, 43 is provided with the wide part 69*a*, the narrow part 69*c* and the width-changing part 69*b* having the inclined curve part 72 between the wide part 69*a* and the narrow part 69*c*, so as to change the thickness dimension upon completion of the inflation. However, each of the divided pieces that are to be sewn to both the panels 41, 43 facing each other may be provided with the wide part, the narrow part and the width-changing part having the inclined curve part between the wide part and the narrow part, so as to change the thickness dimension upon completion of the inflation.

According to an aspect of the invention, there is provided an airbag where panels, which face each other, of an outer peripheral wall upon inflation are configured to change a thickness of the airbag from a thickened part of which a thickness is made to be thick to a thinned part of which a thickness is made to be thin by a tether coupled to the panels, wherein the tether between the panels in a thickness-changing region where the thickness of the airbag is changed from the thickened part to the thinned part is divided into a plurality of pieces along a direction in which the panels face each other, and is thus configured by a plurality of divided pieces to be sewn each other at a linear sewing line, wherein a panel-side divided piece, which is one of the divided pieces and which is sewn to at least one of the panels in the thickness-changing region has, as a width dimension from the linear sewing line with another divided piece adjacent to the panel-side divided piece, a wide part, a narrow part and a width-changing part continued from the wide part to the narrow part, which correspond to a thickness dimension changed from the thickened part to the thinned part, and wherein a panel-side edge, which is sewn to the at least one of the panels, of the panel-side divided piece has a shape including a curve part corresponding to the thickness dimension changed from the thickened part to the thinned part, and is sewn with being overlapped in a planar shape to the at least one of the panels.

According to the airbag of the present invention, at least one of the panel-side divided pieces to be arranged in the thickness-changing region has the width dimension having the wide part, the narrow part and the width-changing part, and is provided with the panel-side edge of the shape including the curve part. However, the panel-side edge including the curve part is sewn with being overlapped in the planar shape to the corresponding panel by a two-dimensional sewing, so that it doesn't take time to perform the sewing operation.

Also, since the divided piece-side edges of the panel-side divided piece and the divided piece adjacent thereto are sewn to each other at the linear sewing line, it doesn't take time to sew the divided pieces each other. When the airbag having the tether inflates, since the panel-side divided piece of the width dimension having the wide part, the narrow part and the width-changing part is arranged in the thickness-changing region, it is possible to complete the inflation in a state where the thickness has changed from the thickened part to the thinned part in a predetermined curve shape in the thickness-changing region.

Therefore, in the airbag of the present invention, even when the tether for changing the thickness from the thickened part to the thinned part in the curve shape is provided, it is possible to easily manufacture the airbag without lowering the operability of the sewing operation.

The airbag having been folded may be configured to be accommodated in a case having a bottom wall part and a sidewall part extending from a peripheral edge of the bottom wall part, upon completion of the inflation, the thickened part of the thickness-changing region may be arranged to continue to a general thickened part arranged at a side spaced from the thinned part, upon completion of the inflation, the general thickened part and the thickened part of the thickness-changing region may be arranged in an area on the bottom wall part of the case, and upon completion of the inflation, the thinned part of the thickness-changing region may be arranged at an outer side of the case deviating from the sidewall part along the bottom wall part.

In the airbag configured as described above, upon completion of the inflation, the thickened part of the thickness-changing region is arranged at the inner side of the case, the thinned part is arranged at the outer side of the case, and the curve part changing from the thickened part to the thinned part is arranged to span the sidewall part of the case, so that the thickened part of the airbag is stably supported to the inner peripheral surface of the sidewall part of the case. For this reason, when the airbag after completion of the inflation receives a protection target, the airbag is stably supported to the case and thus can smoothly receive and hold the protection target without the deviation.

One of the panels may be a case-side panel to be attached to the case and the other of the panels may be a non-case-side panel, the at least one of the panels sawn to the panel-side divided piece may be the case-side panel, and a height dimension of the non-case-side panel from the bottom wall part may be made to be equivalent from the general thickened part to the thickness-changing region upon completion of the inflation.

In the above configuration, upon completion of the inflation of the airbag, the non-case-side panel can be arranged in the planar shape where the height dimension from the bottom wall part of the case is substantially constant, including the thickened part and the thinned part. Therefore, the above configuration is favorable to the airbag that receives the protection target at the wide planar region of the non-case-side panel after completion of the inflation.

An attachment tool for attaching the airbag to the bottom wall part of the case may be to be arranged at a part of the case-side panel in the thickness-changing region, and the panel-side edge of the panel-side divided piece sewn to the case-side panel may have the shape including the curve part to bypass the part at which the attachment tool is arranged.

In the above configuration, since the tether, which forms the thickness-changing region, is sawn to the area including the attachment part, at which the attachment tool is attached, of the case-side panel that is to be attached to the case by the attachment tool, the thickness dimension of the thickness-changing region upon completion of the inflation can be set as the height dimension from the bottom wall part, on the basis of the bottom wall part of the case, and can be thus correctly secured. Also, since the panel-side edge of the panel-side divided piece that is to be sewn to the case-side panel is arranged in an area in which it does not interfere with the attachment tool, the panel-side edge can be smoothly sewn to the case-side panel.

What is claimed is:

1. An airbag where panels, which face each other, of an outer peripheral wall upon inflation are configured to change a thickness of the airbag from a thickened part of which a thickness is made to be thick to a thinned part of which a thickness is made to be thin by a tether coupled between the panels, wherein the tether between the panels in a thickness-changing region where the thickness of the airbag is changed from the thickened part to the thinned part is divided into a plurality of pieces along a direction in which the panels face each other, and is thus configured by a plurality of divided pieces to be sewn to each other at a linear sewing line, wherein a panel-side divided piece, which is one of the divided pieces and which is sewn to at least one of the panels in the thickness-changing region has, as a width dimension from the linear sewing line with another divided piece adjacent to the panel-side divided piece, a wide part, a narrow part and a width-changing part continued from the wide part to the narrow part, which correspond to a thickness dimension changed from the thickened part to the thinned part, and wherein a panel-side edge, which is sewn to the at least one of the panels, of the panel-side divided piece has a shape including a curve part corresponding to the thickness dimension changed from the thickened part to the thinned part, and is sewn with being overlapped in a planar shape to the at least one of the panels.

2. The airbag according to claim 1, wherein
the airbag having been folded is configured to be accommodated in a case having a bottom wall part and a sidewall part extending from a peripheral edge of the bottom wall part,
upon completion of the inflation, the thickened part of the thickness-changing region is arranged to continue to a general thickened part arranged at a side spaced from the thinned part,
upon completion of the inflation, the general thickened part and the thickened part of the thickness-changing region are arranged in an area on the bottom wall part of the case, and
upon completion of the inflation, the thinned part of the thickness-changing region is arranged at an outer side of the case deviating from the sidewall part along the bottom wall part.

3. The airbag according to claim 2, wherein
one of the panels is a case-side panel to be attached to the case and the other of the panels is a non-case-side panel,
the at least one of the panels sewn to the panel-side divided piece is the case-side panel, and
a height dimension of the non-case-side panel from the bottom wall part is made to be equivalent from the general thickened part to the thickness-changing region upon completion of the inflation.

4. The airbag according to claim 3, wherein
an attachment tool for attaching the airbag to the bottom wall part of the case is to be arranged at a part of the case-side panel in the thickness-changing region, and
the panel-side edge of the panel-side divided piece sewn to the case-side panel has the shape including the curve part to bypass the part at which the attachment tool is arranged.

* * * * *